United States Patent
Zhou et al.

(10) Patent No.: US 11,740,156 B1
(45) Date of Patent: Aug. 29, 2023

(54) DIMMING TESTER STATION

(71) Applicant: MLOptic Corp, Redmond, WA (US)

(72) Inventors: Wei Zhou, Sammamish, WA (US); Zhengyuan Wang, Redmond, WA (US); Wei Wang, Redmond, WA (US); Yongshui Cai, Redmond, WA (US)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 18/093,314

(22) Filed: Jan. 4, 2023

(51) Int. Cl.
*G01M 11/02* (2006.01)

(52) U.S. Cl.
CPC ............... *G01M 11/0285* (2013.01)

(58) Field of Classification Search
CPC .......... G01N 21/59; G01N 2021/9583; G01M 11/02–0292; G01M 11/0285
See application file for complete search history.

(56) References Cited

U.S. PATENT DOCUMENTS

| | | | |
|---|---|---|---|
| 5,661,816 A * | 8/1997 | Fantone | G01M 11/0292 382/100 |
| 2012/0274788 A1 * | 11/2012 | Chang | G01M 11/0292 348/188 |

* cited by examiner

*Primary Examiner* — Tarifur R Chowdhury
*Assistant Examiner* — Amanda H Merlino
(74) *Attorney, Agent, or Firm* — Jong Patent Firm; Cheng Ning Jong; Tracy P. Jong

(57) ABSTRACT

A dimming tester station for testing an optical object, the optical object disposed along an axis represented by a central axis of the optical object, the dimming tester station including a motion stage for supporting the optical object, wherein the optical object is disposed between at least one camera with an entrance pupil of the at least one camera disposed in a first plane and a light emitting panel configured to emit light through a front surface disposed in a second plane, the central axis is substantially perpendicular to the first plane and the second plane, the entrance pupil of the at least one camera is disposed in an orientation facing at least a portion of the front surface, the motion stage is configured to be adjustable such that the location of the optical object from each of the first plane and the second plane is alterable.

20 Claims, 3 Drawing Sheets

DIMMING TESTER STATION

BACKGROUND OF THE INVENTION

1. The Field of the Invention

The present invention relates to a dimming tester station. More specifically, the present invention is directed to a comprehensive dimming tester station.

2. Background Art

Various aspects are associated with the dimming performance of a lens or optical object. Among other aspects, the average transmittance and uniformity of a dimming lens are of the utmost importance. In the case of sunglasses, dimming lenses that do not perform uniformly can not only affect the comfort but also the safety of their user. In a conventional setup for testing dimming qualities of lenses and other optical objects, the tests are rather limited. In order to measure the transmittance and uniformity of a dimming lens, two tests are carried out, a first of which is a test without the lens to be tested and the other with the lens tested in a dimming tester station. For instance, an optical object to be tested is set up at fixed distances from a camera at one end and a conventional light panel or lightbox at an opposing end from the camera. With a conventional light panel, it is impossible to produce a uniform light with different colors, brightness or patterns with the same panel.

In a conventional dimming tester station, the optical object under test is typically evaluated for its dimming uniformity based on views of the optical object obtained orthogonally with respect to the optical object. Although such a test is necessary and sufficient for optical object where views through the optical object are typically obtained orthogonally through lines of sight normal to the optical object. For instance, a user of a pair of sunglasses with dimming capabilities, would rarely rotate his or her eyeballs to direct his or her views towards objects in the peripherals of the user's vision. Rather, the user would turn his or her head instead. Therefore, the lines of sight are essentially always disposed orthogonally with the sunglasses. However, with the advent of augmented reality/virtual reality (AR/VR) technologies, head-mounted displays and lenses have become a commonplace. As a user of a dimming-enabled or coupled head-mounted display does not always look straight through the AR/VR glasses disposed in front of their eyes to gather scenes disposed therethrough, this presents new challenges for optical equipment to be tested for performance specifications not important for other types of optical equipment. For instance, a user of AR/VR glasses would look left, right, up or down through AR/VR glasses by rotating his or her eyeballs to view information-rich scenes instead of turning his or her head towards the scenes. The user no longer gathers views through the dimming glasses in lines of sight normal to the dimming glasses only. As such, the user may notice transmittance and uniformity changes through the AR/VR glasses when viewed at an angle that is off normal to the AR/VR glasses. Therefore, the angular dependency of dimming glasses becomes important and the uniformity and transmittance of the dimming glasses at such view angles must also be evaluated in addition to views normal to the dimming glasses.

Further, the speed at which dimming occurs is important and the speed at which dimming is no longer effective once the trigger for dimming has been removed is also important.

In general, dimming lenses which respond immediately to environmental state changes or those which respond to environmental state changes without their user noticing the delays in responding to such changes are more desirable compared to those that take longer to transition from one state to another.

In some embodiments, the dimming materials of sunglasses are triggered by ultraviolet (UV) light, not RGB light. Therefore, some dimming materials may look uniform under UV light but not uniform under RGB light and without testing these sunglasses under UV light, it is impossible to ascertain that these sunglasses would perform normally under the light spectrum for which the sunglasses are designed in terms of transmittance and uniformity. Further, conventional dimming tester stations do not have provisions for other measurements to be made, e.g., distortion, modulation transfer function (MTF) and other tests, e.g., transmittance and uniformity tests for polarized optical objects, to be run.

There exists a need for a dimming tester station which allows comprehensive tests to be conducted on polarized as well as non-polarized optical objects where optical objects are not only evaluated while disposed orthogonally to an imager but also while disposed at an angle to an imager to mimic a use of the optical object not only in sunglasses where the optical objects are often disposed orthogonally to a user's eyes but also in the AR/VR realm where the optical objects are often disposed at an angle to a user's eyes. There also exists a need for a dimming tester station to provide other uses, e.g., in determining the MTF of an optical object and distortions such that measures can be taken to correct for the distortions.

SUMMARY OF THE INVENTION

In accordance with the present invention, there is provided a dimming tester station for testing an optical object, the optical object disposed along an axis represented by a central axis of the optical object, the dimming tester station including:
  a motion stage for supporting the optical object,
  wherein the optical object is disposed between at least one camera with an entrance pupil of the at least one camera disposed in a first plane and a light emitting panel configured to emit light through a front surface disposed in a second plane, the central axis is substantially perpendicular to the first plane and the second plane, the entrance pupil of the at least one camera is disposed in an orientation facing at least a portion of the front surface, the motion stage is configured to be adjustable such that the location of the optical object from each of the first plane and the second plane is alterable, the at least one camera is disposed in a plurality of positions including a first position at which the entrance pupil of the at least one camera intersects the central axis of the optical object and a second position at which the entrance pupil of the at least one camera does not intersect the central axis of the optical object and at least a portion of the light transmitted through the optical object is imageable by the at least one camera for transmittance analysis.

In one embodiment, the motion stage is further configured to be rotatable about an axis substantially parallel to the central axis such that the orientation of the optical object about the central axis of the optical object is alterable.

In accordance with the present invention, there is further provided a dimming tester station for testing an optical object, the optical object disposed along an axis represented by a central axis of the optical object, the dimming tester station including:

a motion stage for supporting the optical object, wherein the optical object is disposed between at least one camera with an entrance pupil of the at least one camera disposed in a first plane and a light emitting panel configured to emit light through a front surface disposed in a second plane, the central axis is substantially perpendicular to the first plane and the second plane, the entrance pupil of the at least one camera is disposed in an orientation facing at least a portion of the front surface, the motion stage is further configured to be rotatable about an axis substantially parallel to the central axis such that the orientation of the optical object about the central axis of the optical object is alterable, the at least one camera is disposed in a plurality of positions including a first position at which the entrance pupil of the at least one camera intersects the central axis of the optical object and a second position at which the entrance pupil of the at least one camera does not intersect the central axis of the optical object and at least a portion of the light transmitted through the optical object is imageable by the at least one camera for transmittance analysis.

In one embodiment, the motion stage is further configured to be adjustable such that the location of the optical object from each of the first plane and the second plane is alterable.

In accordance with the present invention, there is further provided a dimming tester station for testing an optical object, the optical object disposed along an axis represented by a central axis of the optical object, the dimming tester station including:

(a) a light emitting panel configured to emit light through a front surface disposed in a first plane; and (b) at least one camera with an entrance pupil of the at least one camera disposed in a second plane, the entrance pupil of the at least one camera configured to face at least a portion of the front surface, wherein the central axis is substantially perpendicular to the first plane and the second plane and the optical object is configured to be disposed between the light emitting panel and the at least one camera and at least one of the location of the optical object from each of the first plane and the second plane; and the orientation of the optical object about the central axis of the optical object, is configured to be alterable, the at least one camera is configured to be disposed in at least one of a plurality of positions including a first position at which the entrance pupil of the at least one camera intersects the central axis of the optical object and a second position at which the entrance pupil of the at least one camera does not intersect the central axis of the optical object and at least a portion of the light transmitted through the optical object is imageable by the at least one camera for transmittance analysis.

In one embodiment, the light emitting panel includes a display panel. In one embodiment, the light emitting panel can be a liquid crystal display (LCD) panel, a light emitting diode (LED) panel, a plasma display panel or a uniform light lightbox. In one embodiment, the light emitting panel is configured to produce a light pattern of a uniform light emission or a light emission according to a checkerboard pattern through the front surface. In one embodiment, the dimming tester station further includes a rotatable motion stage, wherein the orientation of the optical object about the central axis of the optical object is configured to be alterable using the rotatable motion stage. In one embodiment, the dimming tester station further includes a translatable motion stage, wherein the location of the optical object from each of the first plane and the second plane is configured to be alterable using the translatable motion stage. In one embodiment, the dimming tester station further includes a controller functionally connected to the at least one camera and the light emitting panel, the light emitting panel configured to be turned on or off and the at least one camera controlled to capture time-lapsed images of responses of the optical object with respect to the light emitting panel being turned on or off. In one embodiment, the light emitting panel is configured to emit light of at least one of a plurality of wavelengths. In one embodiment, the optical object can be a sunglass lens, a myopia lens, a hyperopia lens, a corrective lens or a waveguide substrate.

An object of the present invention is to provide a dimming tester station suitable for testing an optical object of its dimming uniformity spectrally, spatially and angularly.

Another object of the present invention is to provide a dimming tester station suitable for testing dimming lenses coupled with Augmented Reality/Virtual Reality (AR/VR) lenses.

Another object of the present invention is to provide a dimming tester station suitable for testing an optical object of its dimming uniformity with respect to its polarization.

Another object of the present invention is to provide a dimming tester station suitable for testing an optical object of its dimming uniformity with respect to a light spectrum used, e.g., visible light and UV light.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—dimming tester station

4—camera

Figure 1:
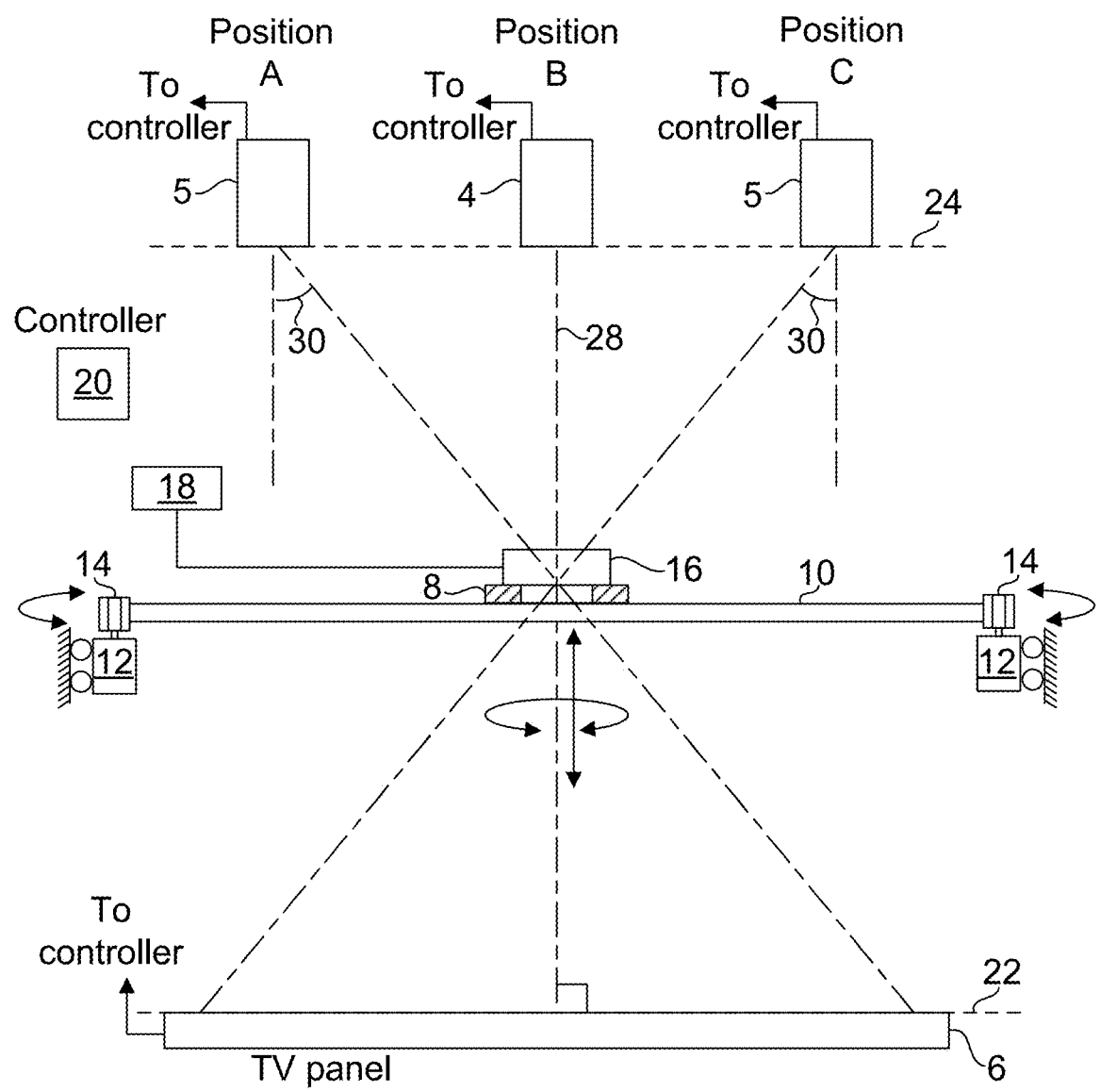
FIG. 1 is a side view of one embodiment of a dimming tester station useful for analyzing the transmittance of an optical object.

6—light emitting panel, e.g., display panel, e.g., television (TV)
8—holder for device under test
10—motion stage
12—device for providing linear motion to motion stage
14—device for providing rotational motion to motion stage
16—device under test
18—dimming device, by means of voltage or ultraviolet (UV) rays
20—controller
22—plane
24—plane
26—lens showing distortion
28—central axis of optical object
30—angle

PARTICULAR ADVANTAGES OF THE INVENTION

The present dimming tester station allows comprehensive tests to be performed on a device under test. The use of a display panel, e.g., a television (TV) panel as a light emitting panel allows more than one pattern to be displayed to provide a larger number of tests without requiring more than one light emitting panel.

With a sufficiently large field of view (FOV), a camera of the present dimming tester station is configured to capture images of a device under test (DUT) that is not perpendicularly disposed with that camera. Further, the distance between the camera and a DUT disposed orthogonally to the camera can be adjusted in the present dimming tester station. By the same token, a DUT that is not disposed in a position normal to the camera is affected by this change in position of the DUT not disposed in a position normal to the camera. By moving the camera closer to the DUT, the camera is configured to receive a view with a larger angle from the center of the FOV and by moving the camera closer to the DUT, the camera is configured to receive a view with a narrower angle from the center of the FOV. Various angular views of the DUT can be obtained when the DUT is disposed at an angle non-orthogonal with respect to the camera. Therefore, in addition to spatial changes between the camera and a DUT, the angular change of the optical object relative to the camera allows the dimming performance of the DUT to be evaluated at an angle. In addition to measuring uniformity based on a perpendicular path, angular domain uniformity measurements are now possible.

In one embodiment, a controller of the present dimming tester station is configured to cause a camera to capture time-lapsed images of responses of the optical object with respect to the light emitting panel being turned on or off. This way, the speed upon which the optical object responds to the light emitting panel in terms of transmittance changes can be evaluated.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

A device under test (DUT) or an optical object, as used herein, refers to a device under test (DUT) or an optical element where the responses, e.g., the transmittance and uniformity of the optical element to a test, e.g., a dimming test, are obtained and evaluated. An optical object can be, but not limited to, a lens, e.g., a sunglass, a myopia glass, a hyperopia glass, a corrective lens or a waveguide substrate, etc.

FIG. 1 is a side view of one embodiment of a dimming tester station 2 useful for analyzing the transmittance of an optical object 16. Only one optical object 16 is shown although the tester station 2 is useful for testing as many optical objects as the motion stage 10 of the tester station 2 can accommodate. The optical object 16 is disposed along an axis represented by a central axis 28 of the optical object 16. The dimming tester station 2 includes a motion stage 10 for supporting the optical object, the motion stage 10 is configured to be rotatable about an axis substantially parallel to the central axis 28 such that the orientation of the optical object 16 about the central axis 28 of the optical object 16 or DUT is alterable. In one embodiment, this motion can be realized by using a device 14 for providing rotational motion to the motion stage 10, making the motion stage 10 rotatable. In one example, this device can be a drive gear/driven gear mechanism or any rotational device which can either be adjusted manually or automatically with an actuator, e.g., a motor. By imaging dimming responses while the optical object 16 is disposed at various orientations about the central axis of the optical object 16, the transmittance and uniformity data of the dimming responses of a polarized optical object 16 can be obtained and evaluated. In one embodiment, the optical object is polarized as a linear polarizer. If the front surface of the light emitting panel 6 is also polarized, e.g., also as a linear polarizer, the light emitting panel can be configured to send linearly polarized light up for a transmittance and uniformity test. The DUT can then be rotated about its central axis and while viewed from a camera disposed above the DUT, dimming and undimming of the DUT can be observed and evaluated.

In one embodiment, an evaluation of the transmittance and uniformity of the optical object 16 results in a determination whether the optical object 16 passes the test where the optical object is deemed worthy to be supplied to a customer or fails the test where the optical object is deemed defective and prevented from being supplied to a customer. The optical object 16 is disposed between the cameras 4, 5 with an entrance pupil of the at least one camera 4, 5 disposed in a first plane 24 and a light emitting panel 6 configured to emit light through a front surface disposed in a second plane 22. There are three cameras shown in FIG. 1 although one would be sufficient if the only camera can be moved from one location to another. With more than one camera, multiple optical objects can be tested simultaneously, increasing the throughput of testing. Only one optical object 16 is shown in FIG. 1 although each camera 4, 5 may be paired with an optical object 16, again, to increase the throughput of testing. The central axis 28 is substantially perpendicular to the first plane 24 and the second plane 22, the entrance pupils of the cameras 4, 5 are disposed in an orientation facing at least a portion of the front surface of the light emitting panel 6 such that the light cast through the optical object 16 is visible from the cameras 4, 5. The first plane 24 and the second plane 22 are substantially parallel to one another. The motion stage 10 is further configured to be adjustable such that the location of the optical object 16 from each of the first plane 24 and the second plane 26 is alterable, e.g., the motion stage 10 can be driven up and down along the central axis 28 of the optical object 16. Each optical object 16 may be further supported by a holder 8 which secures it to the motion stage 10. The motion stage 10 and any holders 8 used for securing optical objects 16 to the motion stage 10 shall not alter the optical object 16 optically. Care must be taken to ensure that the portions of the motion stage 10 or the holders 8 superposing the camera view of an optical object of interest must be transparent or non-existent (e.g., void of materials) to remove any interference of the holders 8 and motion stage 10 with imaging of the optical object 16. The cameras are disposed in a plurality of positions including a first position at which the entrance pupil of a camera 4 intersects the central axis 28 of the optical object 16 and a second position at which the entrance pupil of the cameras 5 does not intersect the central axis 28 of the optical object 16 and at least a portion of the light transmitted through the optical object 16 is imageable by the cameras 4, 5 for transmittance analysis. It shall be noted that, when a camera 5 is disposed off axis from an optical object 16, with a sufficiently large field of view (FOV), the camera 5 is still capable of capturing images of the optical object 16 that is not perpendicularly disposed with that camera 5. If the optical object is an augmented reality/virtual reality AR/VR glass, any dimming test data collected at this angular relationship between the camera 5 and the optical object 16 represents images that a user would see by rotating one's eyeballs when viewing the AR/VR glass disposed in front of the eyes. Therefore, by having this test, the transmittance and uniformity of the AR/VR glass can be verified at the angular relationship. It shall be appreciated that the severity of this angular relationship can be altered by moving the motion stage 10 up and down, i.e., in a direction parallel to the central axis 28 of the optical object 16 with the angle 30 becoming more severe as optical object 16 is moved closer to the cameras 5. In one embodiment, this motion can be realized by using a device 12 for providing linear motion to the motion stage. In one example, this device can be a roller/track mechanism or any translational device which can either be adjusted manually or automatically with an actuator to make the motion stage 10 translatable. There is a minimum distance between a camera 5 and the optical object 16 where the optical object 16 needs to be disposed to fall within the FOV of the camera 5. Further, as certain glasses, e.g., AR/VR glasses, must perform in an environment where only RGB light is available, they must be tested under RGB light. Under a full spectrum condition, e.g., sunlight, the transmittance and uniformity may appear acceptable. However, with a significantly narrower band of wavelengths in RGB light, images viewed through these glasses may appear washed out.

In one embodiment, the light emitting panel 6 includes a display panel, e.g., a television (TV) panel. The light emitting panel can be, but not limited, to a liquid crystal display (LCD) panel, a light emitting diode (LED) panel, a plasma display panel or a uniform light lightbox. The benefits for using a changeable display, e.g., an LCD, an LED or a plasma display panel, however, include the ability to provide light at various wavelengths of a spectrum by simply controlling and specifying the output to be displayed without physically changing the display. Further, a display that is other than a uniform light, e.g., a checkboard pattern, etc., can also be provided through the front surface.

In one embodiment, the dimming tester station further includes a controller 20 functionally connected to the at least one camera and the light emitting panel, the light emitting panel configured to be turned on or off and the at least one camera controlled to capture time-lapsed images of responses of the optical object with respect to the light emitting panel being turned on or off. For instance, the controller 20 is configured to time synchronizes with both a camera and the light emitting panel. The controller 20 is configured to then send a command to turn off the light emitting panel while the camera records its view of the DUT. The camera views are then examined to determine the delay in which the dimming effect (as determined by the transmittance and uniformity) of the DUT has completely faded due to the lack of output from the light emitting panel. In order to determine the effect of turning on the light emitting panel on the DUT, the controller 20 is configured to send a command to turn on the light emitting panel while the camera records its view of the DUT. The camera views are then examined to determine the delay the DUT takes to reach a steady state in reacting to the light emitting panel being turned on.

Some dimming materials are incapable of responding to the light spectrum of visible light, e.g., RGB light provided by an LCD, LED or plasma display panel. In one embodiment, an ultraviolet (UV) light emitter 18 that replaces the light emitting panel is used to test optical objects having dimming materials responsive only to UV light. In one embodiment, a device 18 configured to apply an electrical potential to dimming materials responsive only to such electrical potential, is used to test dimming responses of optical objects with such materials.

In one embodiment, the light emitting panel is configured to emit light of at least one of a plurality of wavelengths. Again, with a light emitting panel 6 capable of providing one of a plurality of wavelengths as disclosed elsewhere herein, dimming tests can be performed under one of the plurality of wavelengths. This is useful for dimming materials responsive only to light of one or more specific wavelengths as visible light of a fuller spectrum would mask the true performance of the dimming materials in transmittance and uniformity. As the light emitting panel 6 can be tuned to output individual RGB colors, spectral dependence of dimming response of the optical object 16 can be measured.

Figure 2:
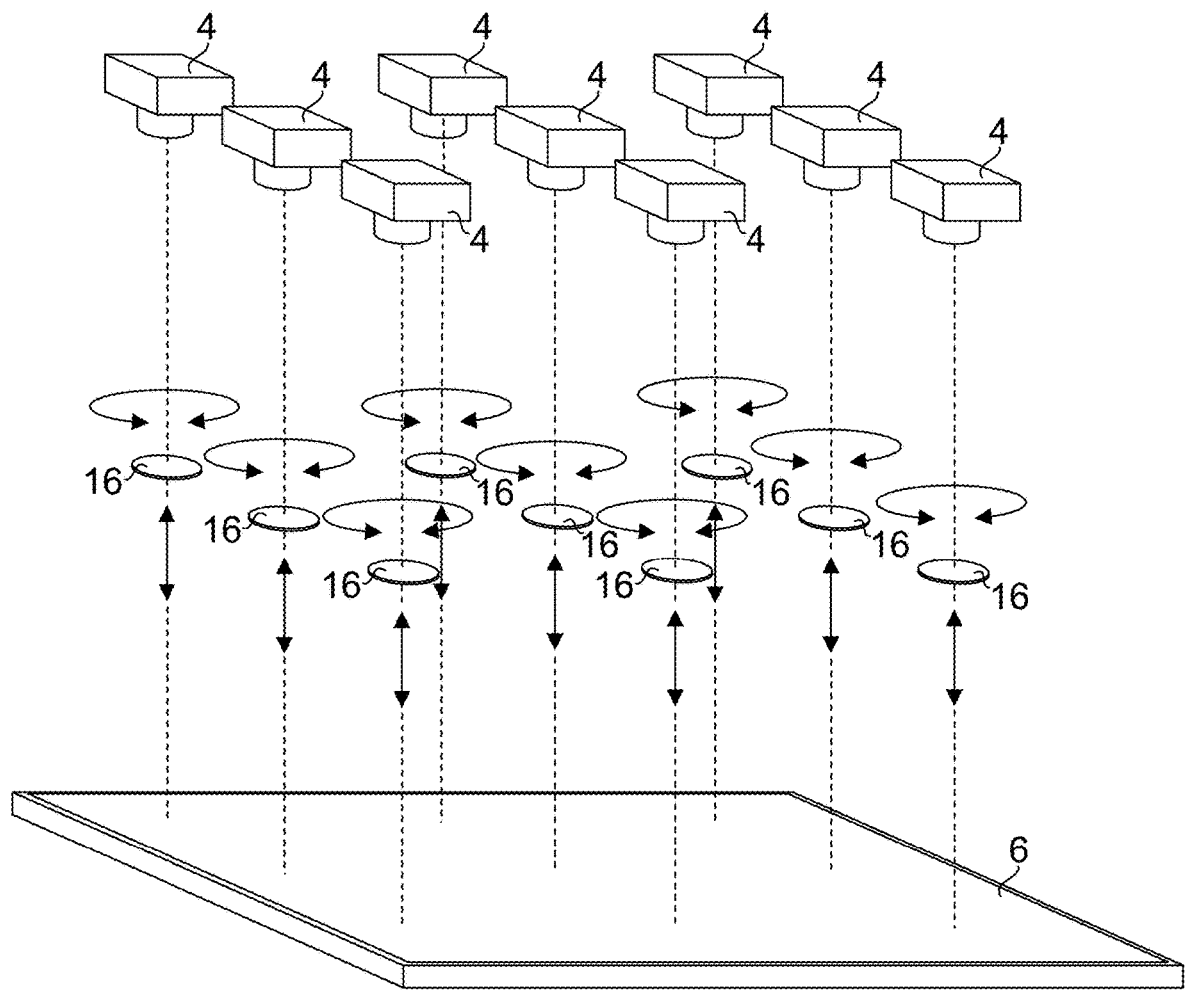
FIG. 2 is a top perspective view of one embodiment of a dimming tester station useful for analyzing the transmittance of an optical object.
Figure 3:
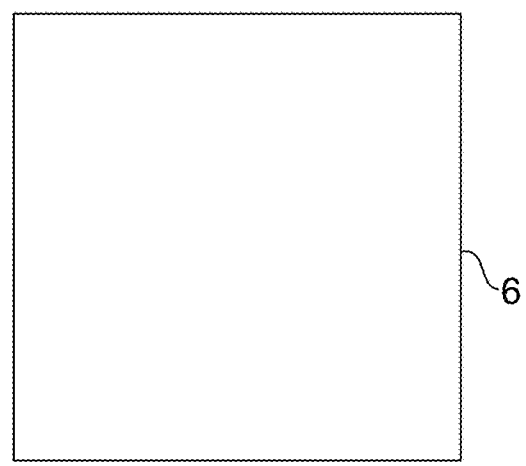
FIG. 3 is a diagram showing a light panel displaying a uniform light projection.

FIG. 2 is a top perspective view of one embodiment of a dimming tester station useful for analyzing the transmittance of an optical object. Here, the cameras 4 are arranged in a 3×3 matrix format and there is a same number of DUTs to match. No details are shown of a motion stage and mechanisms useful for causing linear and rotational motions of the motion stage. For the rotational motion of a DUT, each DUT is shown to be independently rotatable as the rotation of a DUT is not linked to the rotation of its neighbors. Care must be taken to ensure that while this shows a compact arrangement of DUTs for maximum throughput, the motion stage/s associated with the DUTs must not cause the DUTs to interfere with one another for the light projection of the light emitting panel. FIG. 3 is a diagram showing a light panel displaying a uniform light projection. It shall be noted that such panel is void of any patterns and the areas near the edges are just as good for use as a light panel as the center of the panel as long as a DUT is disposed directly above a light-projected area.

Figure 4:
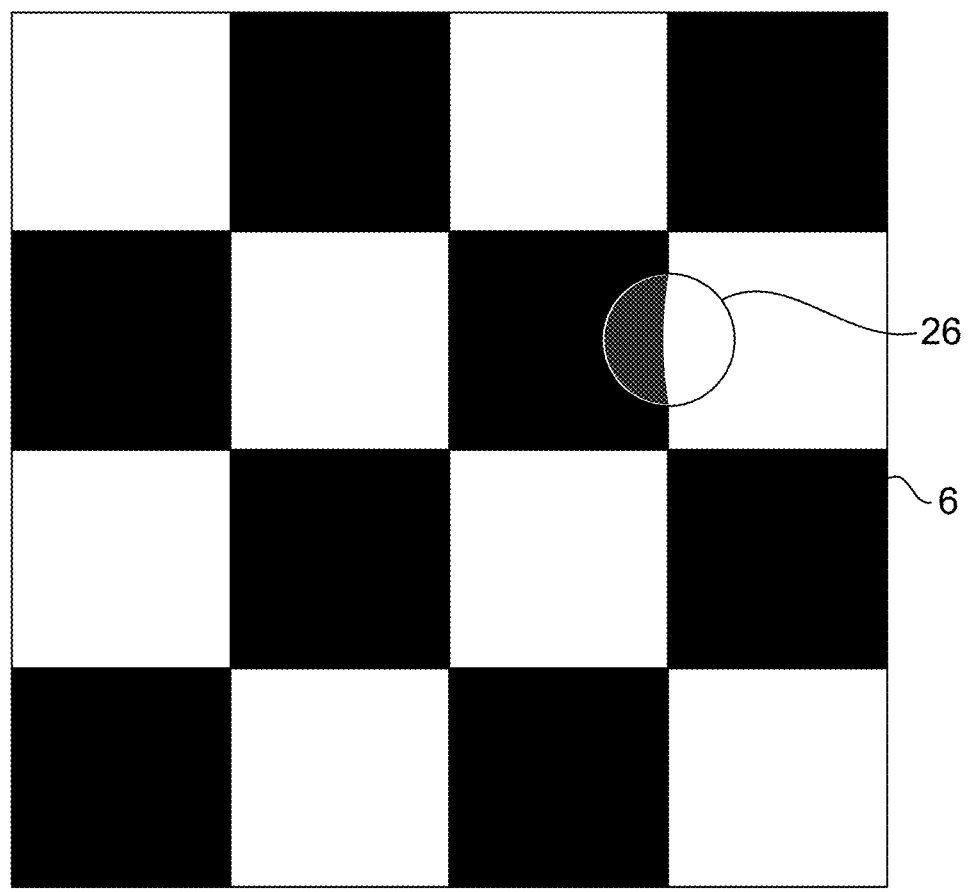
FIG. 4 is a diagram showing a light panel displaying the projection of a checkerboard pattern.

FIG. 4 is a diagram showing a light panel displaying the projection of a checkerboard pattern. By imaging the DUT 16 against a backdrop of a checkerboard pattern, any distortions observed through the lens 26 can be measured and corrections for such distortions can be made in the display information, e.g., in software, to be projected on a display of an AR/VR glass such that when viewed by a user, the image on the AR/VR glass will appear without the distortions. A checkerboard pattern provides numerous high contrast edges for such distortions to be observed and measured.

With a corrective lens, e.g., a myopia lens, a hyperopia lens, a corrective lens or another high-power lens as a DUT, it is further possible to use the present dimming tester station for determining the modulation transfer function (MTF) of the lenses. The DUT is disposed close to the light emitting panel 6 displaying a checkboard pattern. First, a zero-power lens or a lens of zero diopter is imaged. A non-zero-power lens, e.g., a myopia lens or a hyperopia lens is imaged and compared to the image from the zero-power lens to compute the MTF of the non-zero-power lens. The MTF determination is important as a flawed manufacturing process, e.g., a flawed injection molding process can cause the material lens density changes, resulting in lens power and focus changes. The camera lens may need to be adjusted to refocus on the DUT as it is disposed close to the light emitting panel 6.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A dimming tester station for testing an optical object, the optical object disposed along an axis represented by a central axis of the optical object, said dimming tester station comprising: a motion stage for supporting the optical object: and a device configured to apply an electrical potential to the optical object to cause a dimming response in the optical object having a dimming material responsive to said electrical potential, wherein the optical object is disposed between at least one camera with an entrance pupil of the at least one camera disposed in a first plane and a light emitting panel configured to emit light through a front surface disposed in a second plane, the central axis is substantially perpendicular to the first plane and the second plane, the entrance pupil of the at least one camera is disposed in an orientation facing at least a portion of the front surface, said motion stage is configured to be adjustable such that the location of the optical object from each of the first plane and the second plane is alterable, the at least one camera is disposed in a plurality of positions comprising a first position at which the entrance pupil of said at least one camera intersects the central axis of the optical object and a second position at which the entrance pupil of the at least one camera does not intersect the central axis of the optical object and at least a portion of the light transmitted through the optical object is imageable by the at least one camera for transmittance analysis to measure the transmittance and uniformity of the dimming response of the optical object.

2. The dimming tester station of claim 1, wherein said motion stage is further configured to be rotatable about an axis substantially parallel to the central axis such that the orientation of the optical object about the central axis of the optical object is alterable.

3. The dimming tester station of claim 1, wherein the light emitting panel is a display panel.

4. The dimming tester station of claim 1, wherein the light emitting panel is a panel that produces a light pattern selected from the group consisting of a uniform light emission and a light emission according to a checkerboard pattern through the front surface.

5. The dimming tester station of claim 1, further comprising a controller functionally connected to the at least one camera and the light emitting panel, the light emitting panel is configured to be turned on or off and the at least one camera is controlled to capture time-lapsed images of responses of the optical object with respect to the light emitting panel being turned on or off.

6. The dimming tester station of claim 1, wherein the light emitting panel is a panel configured to emit light of at least one of a plurality of wavelengths.

7. A dimming tester station for testing an optical object, the optical object disposed along an axis represented by a central axis of the optical object, said dimming tester station comprising: a motion stage for supporting the optical object: and a device configured to apply an electrical potential to the optical object to cause a dimming response in the optical object having a dimming material responsive to said electrical potential, wherein the optical object is disposed between at least one camera with an entrance pupil of the at least one camera disposed in a first plane and a light emitting panel configured to emit light through a front surface disposed in a second plane, the central axis is substantially perpendicular to the first plane and the second plane, the entrance pupil of the at least one camera is disposed in an orientation facing at least a portion of the front surface, said motion stage is further configured to be rotatable about an axis substantially parallel to the central axis such that the orientation of the optical object about the central axis of the optical object is alterable, the at least one camera is disposed in a plurality of positions comprising a first position at which the entrance pupil of said at least one camera intersects the central axis of the optical object and a second position at which the entrance pupil of the at least one camera does not intersect the central axis of the optical object and at least a portion of the light transmitted through the optical object is imageable by the at least one camera for transmittance analysis to measure the transmittance and uniformity of the dimming response of the optical object.

8. The dimming tester station of claim 7, wherein said motion stage is further configured to be adjustable such that the location of the optical object from each of the first plane and the second plane is alterable.

9. The dimming tester station of claim 7, wherein the light emitting panel is a panel that produces a light pattern selected from the group consisting of a uniform light emission and a light emission according to a checkerboard pattern through the front surface.

10. The dimming tester station of claim 7, further comprising a controller functionally connected to said at least one camera and the light emitting panel, the light emitting panel is configured to be turned on or off and the at least one camera is controlled to capture time-lapsed images of responses of the optical object with respect to the light emitting panel being turned on or off.

11. The dimming tester station of claim 7, wherein the light emitting panel is a panel configured to emit light of at least one of a plurality of wavelengths.

12. A dimming tester station for testing an optical object, the optical object disposed along an axis represented by a central axis of the optical object, said dimming tester station comprising:
 (a) a light emitting panel configured to emit light through a front surface disposed in a first plane;
 (b) at least one camera with an entrance pupil of said at least one camera disposed in a second plane, said entrance pupil of said at least one camera configured to face at least a portion of said front surface; and
 (c) a device configured to apply an electrical potential to the optical object to cause a dimming response in the optical object having a dimming material responsive to said electrical potential,
 wherein the central axis is substantially perpendicular to said first plane and said second plane and the optical object is configured to be disposed between said light emitting panel and said at least one camera and at least one of the location of the optical object from each of said first plane and said second plane; and the orientation of the optical object about the central axis of the optical object; is configured to be alterable, said at least one camera is configured to be disposed in at least one of a plurality of positions comprising a first position at which said entrance pupil of said at least one camera intersects the central axis of the optical object and a second position at which said entrance pupil of said at least one camera does not intersect the central axis of the optical object and at least a portion of the light transmitted through the optical object is imageable by said at least one camera for transmittance analysis to measure the transmittance and uniformity of the dimming response of the optical object.

13. The dimming tester station of claim 12, wherein said light emitting panel comprises a display panel.

14. The dimming tester station of claim 12, wherein said light emitting panel is a panel selected from the group consisting of a liquid crystal display (LCD) panel, a light emitting diode (LED) panel, a plasma display panel and a uniform light lightbox.

15. The dimming tester station of claim 12, wherein said light emitting panel is configured to produce a light pattern selected from the group consisting of a uniform light emission and a light emission according to a checkerboard pattern through said front surface.

16. The dimming tester station of claim 12, further comprising a rotatable motion stage, wherein the orientation of the optical object about the central axis of the optical object is configured to be alterable using said rotatable motion stage.

17. The dimming tester station of claim 12, further comprising a translatable motion stage, wherein the location of the optical object from each of said first plane and said second plane is configured to be alterable using said translatable motion stage.

18. The dimming tester station of claim 12, further comprising a controller functionally connected to said at least one camera and said light emitting panel, said light emitting panel configured to be turned on or off and said at least one camera controlled to capture time-lapsed images of responses of the optical object with respect to said light emitting panel being turned on or off.

19. The dimming tester station of claim 12, wherein said light emitting panel is configured to emit light of at least one of a plurality of wavelengths.

20. The dimming tester station of claim 12, wherein the optical object is an object selected from the group consisting of a sunglass lens, a myopia lens, a hyperopia lens, a corrective lens and a waveguide substrate.

* * * * *